(No Model.) 4 Sheets—Sheet 1.

R. R. SPEAR.
CHECK ROW CORN PLANTER.

No. 557,160. Patented Mar. 31, 1896.

Witnesses:
C. F. Wilcox.
W. J. Tansley.

Inventor: Riley R. Spear,
By Thomas G. and J. Ralph Orwig
Attorneys (No Model.) 4 Sheets—Sheet 2.

R. R. SPEAR.
CHECK ROW CORN PLANTER.

No. 557,160. Patented Mar. 31, 1896.

Witnesses:
C. F. Wilcox.
W. J. Bankey.

Inventor: Riley R. Spear,
By Thomas O. and J. Ralph Orwig, Attys.

(No Model.) 4 Sheets—Sheet 3.
R. R. SPEAR.
CHECK ROW CORN PLANTER.
No. 557,160. Patented Mar. 31, 1896.
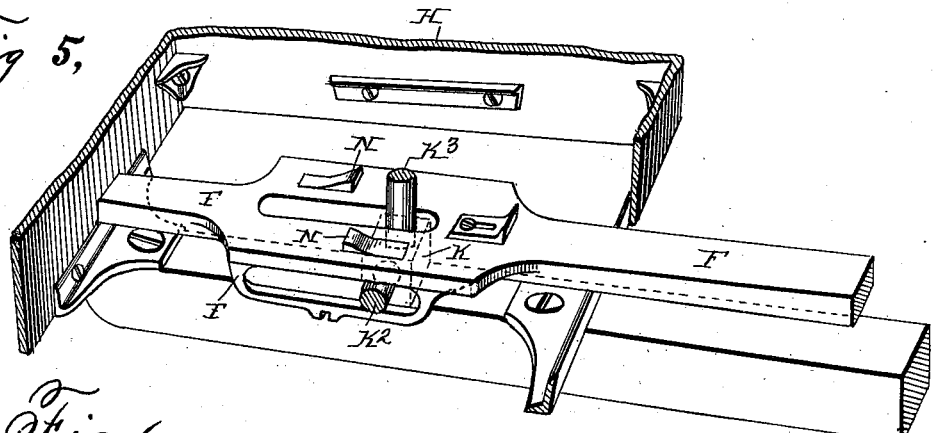
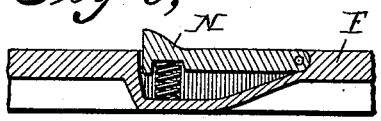
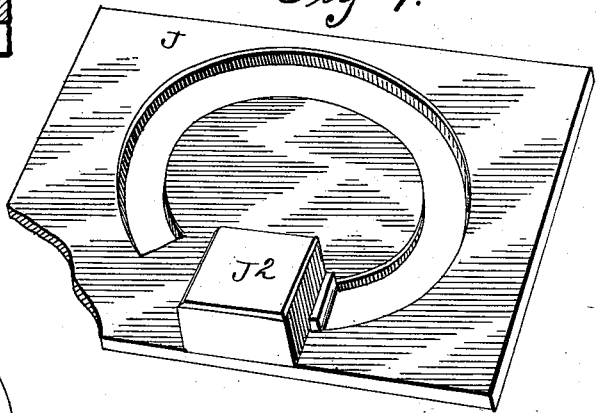
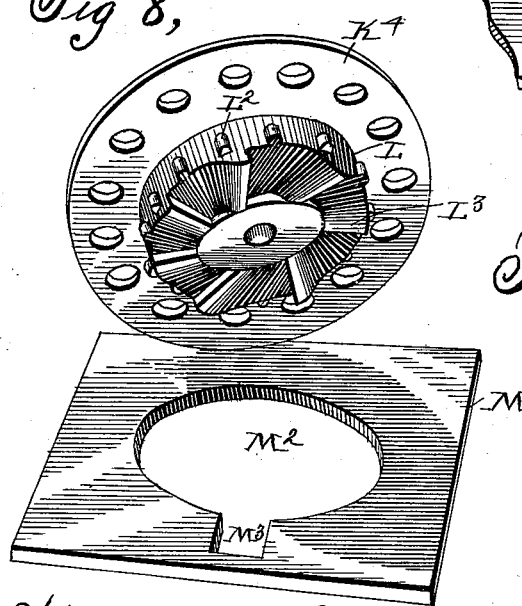
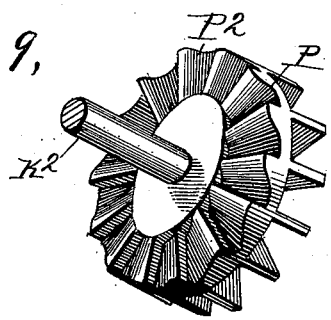
Witnesses:
C. F. Wilcox.
W. J. Bansley.
Inventor: Riley R. Spear,
By Thomas G. and J. Ralph Orwig,
Attorneys.

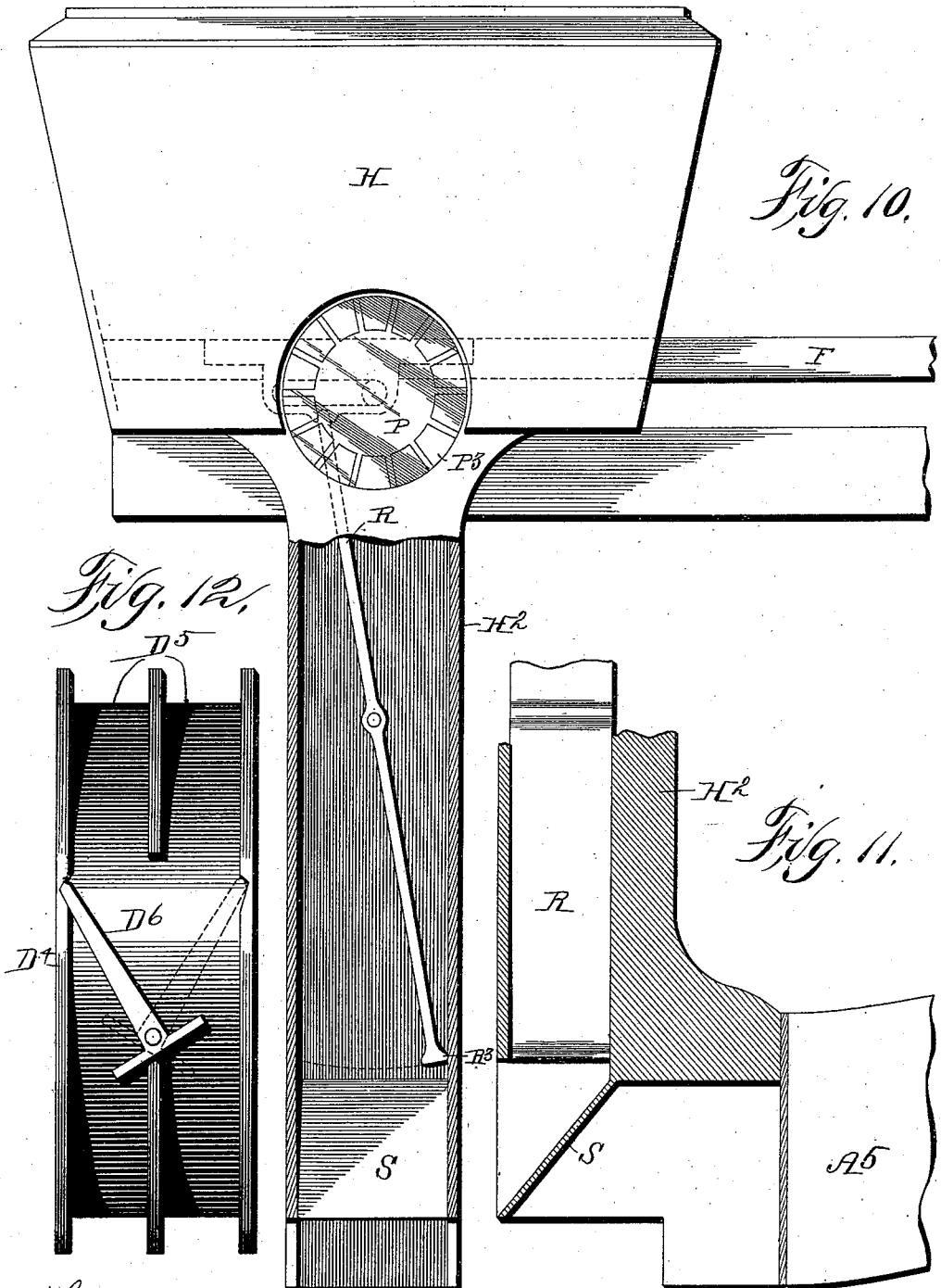

UNITED STATES PATENT OFFICE.

RILEY R. SPEAR, OF WAUKEE, IOWA.

CHECK-ROW CORN-PLANTER.

SPECIFICATION forming part of Letters Patent No. 557,160, dated March 31, 1896.

Application filed October 29, 1895. Serial No. 567,255. (No model.)

*To all whom it may concern:*

Be it known that I, RILEY R. SPEAR, a citizen of the United States of America, residing at Waukee, in the county of Dallas and State of Iowa, have invented a Check-Row Corn-Planter, of which the following is a specification.

The objects of this invention are, first, to provide a planter that will automatically drop corn in hills equidistant from each other without the use of a knotted wire stretched across the field.

A further object is to provide means for automatically making a mark on the ground-surface at the side of each hill planted, so that the operator may readily ascertain at any time whether the rows of hills are in alinement.

A further object is to provide means whereby the machine may be accurately set so that when it next operates to drop corn the position of the hill will be in alinement with the hills in the rows previously planted.

A further object is to provide corn-dropping mechanism in which the grains cannot be cut or broken and in which the number of grains to be planted in the hills is visible to the operator at all times.

My invention consists in certain details of construction and in the arrangement and combination of parts as hereinafter set forth, pointed out in my claims, and illustrated in the accompanying drawings, in which—

Figure 1:
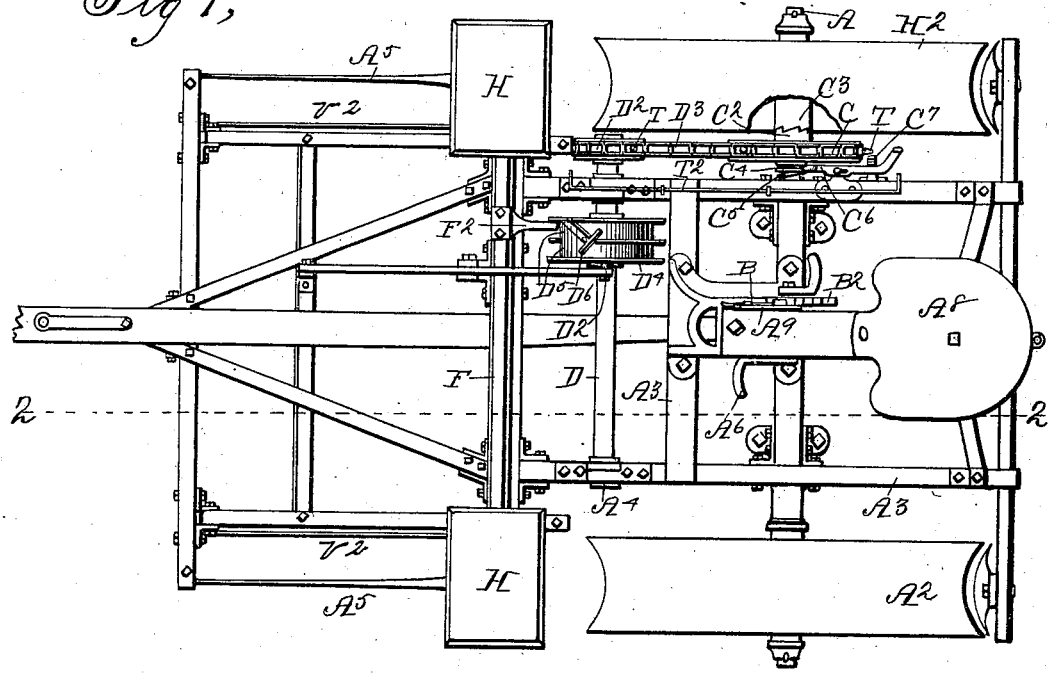
Figure 2:
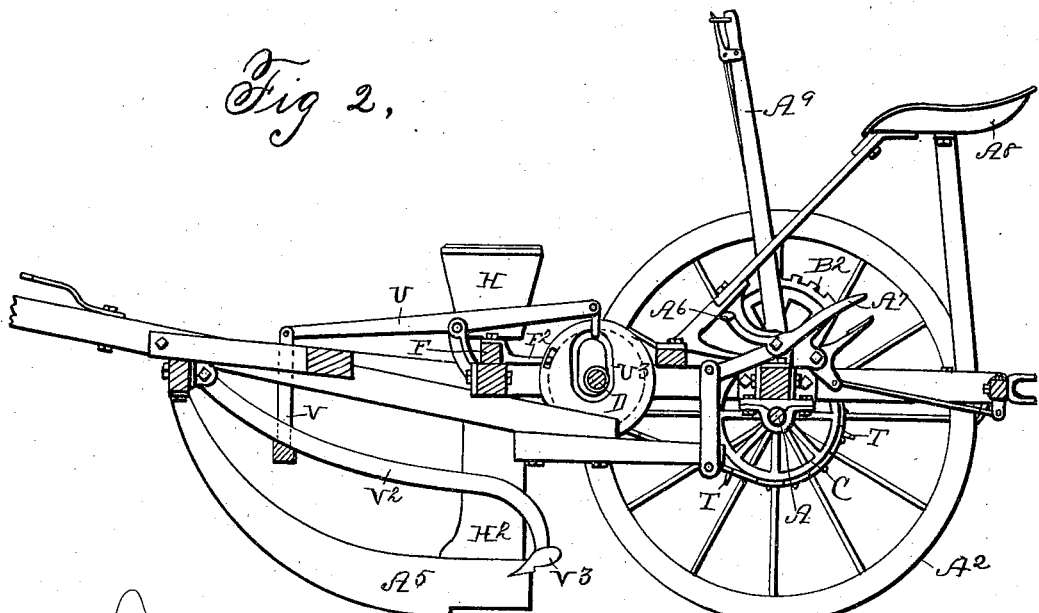
Figure 3:
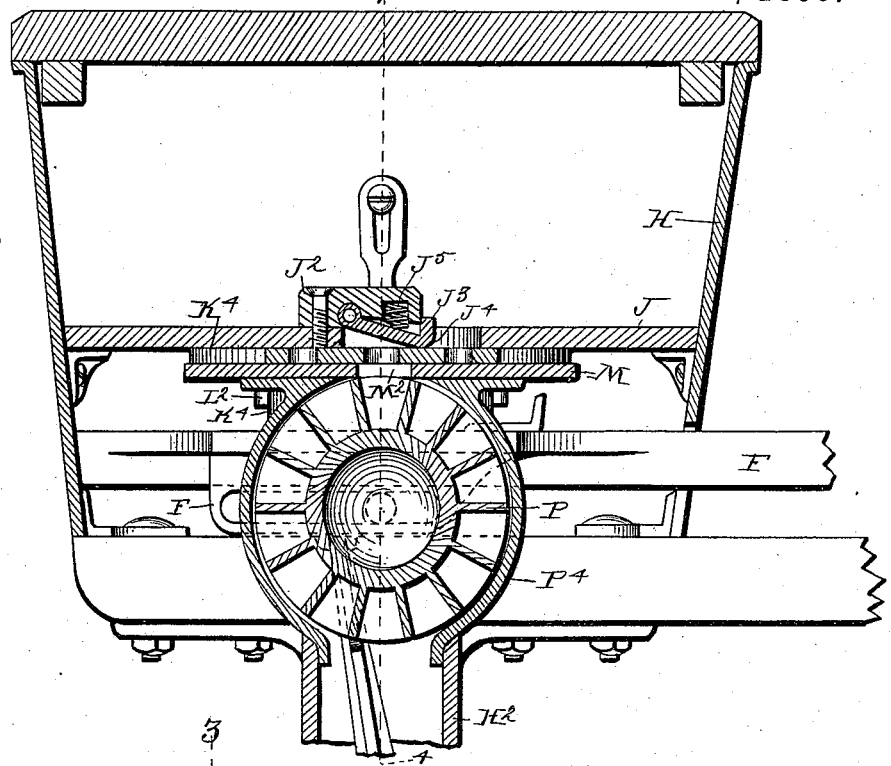
Figure 4:
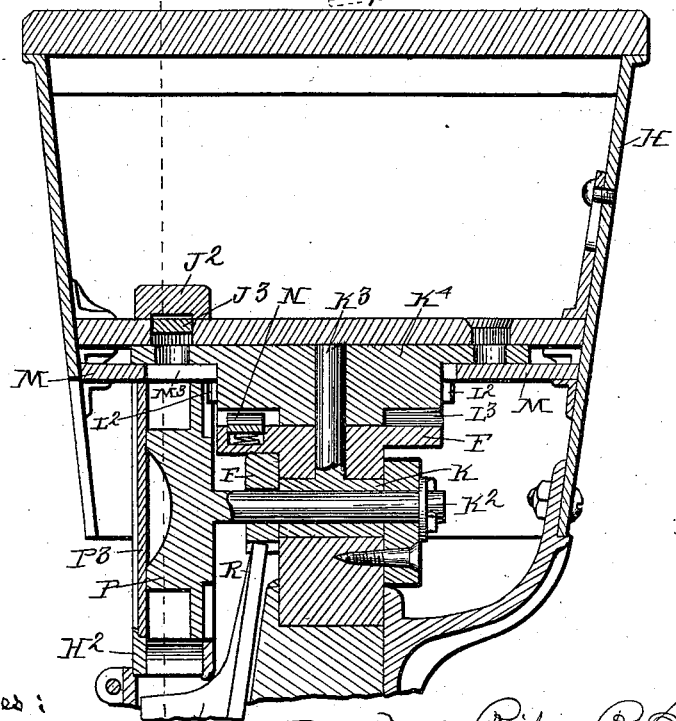

Figure 1 is a top or plan view of the complete machine. Fig. 2 is a side elevation of the same. Fig. 3 is a vertical section of the hopper and dropping mechanism, taken through the line 3 3 of Fig. 4. Fig. 4 is a section through the line 4 4 of Fig. 3. Fig. 5 is a detail perspective view of the mechanism for actuating the corn-dropping devices. Fig. 6 is a detail sectional view showing the device for preventing the grains of corn becoming cut or broken. Fig. 7 is a perspective view of the top plate for separating the corn. Fig. 8 is a perspective view of the devices used in conjunction with the plate shown in Fig. 7 for separating a certain number of grains to be dropped in each hill. Fig. 9 is a perspective of the device for holding the grains of corn until dropped. Fig. 10 shows a detail view illustrating the connection of the corn-dropping mechanism with the slide. Fig. 11 shows a detail sectional view of the heel of the runner. Fig. 12 shows the grooved wheel and its T-switch.

Referring to the accompanying drawings, the reference-letter A is used to indicate the rear axle, $A^2$ the driving-wheels fixed thereto, and $A^3$ the machine-frame mounted on said axle. In common with other corn-planters, the front end of the frame is hinged at $A^4$, so that the runners $A^5$ may be raised and lowered relative to the ground-surface. This movement is accomplished by the foot-levers $A^6$ and $A^7$ journaled beneath the driver's seat $A^8$. The hand-lever $A^9$, bearing a spring-actuated detent B that is designed to engage a fixed segmental rack $B^2$, provides means whereby the runners may be elevated by hand and held in any position. This arrangement of parts, however, is not claimed as new.

C indicates a sprocket-wheel loosely mounted on the driving-axle and having on one end of its hub a clutch $C^2$, designed to engage a clutch $C^3$ on the axle, and on its other hub an annular groove $C^4$. A spring $C^5$ on the axle normally presses the sprocket-wheel's clutch against the clutch on the axle. To disengage the clutches and thus throw the sprockets out of gear, I have provided a forked lever $C^6$ to enter the groove $C^4$ and a rack $C^7$ to engage the lever and hold it in any position in which it may be placed.

D indicates a shaft rotatably mounted in the structural work of the frame in advance of the main axle. It is arranged to be driven by a sprocket-wheel $D^2$ fixed thereto and a chain $D^3$ connecting the wheels $D^2$ and C. On this axle is fixed a device for imparting motion to the seed-dropping mechanism. It comprises a disk $D^4$, having two parallel peripheral grooves $D^5$ and having a portion of the central partition removed, and a T-shaped switch $D^6$, pivoted in the peripheral center of the disk, with its outer end long enough to engage the sides of the grooves and extend at an easy angle to the pivotal point. Its other ends project laterally to a point near the sides of the grooves.

F indicates a bar slidingly mounted on the machine-frame and having its ends passed into the seed-hoppers to actuate the dropping mechanism, as hereinafter described.

The bar is moved by means of the arm $F^2$, fixed thereto and extended into the grooved wheel $D^4$. As the said wheel rotates, the end of the switch engages the arm $F^2$ and forces the arm laterally until it strikes the lateral extension on the switch, whereupon the switch is moved so as to engage the arm in the opposite groove upon the succeeding revolution of the disk $D^4$. Thus the bar F is moved longitudinally upon each revolution of the disk $D^4$.

At each end of the bar F is a seed-hopper H, and communicating with the bottom of the hopper a hollow upright $H^2$, connected with the runner or furrow-opener $A^5$. The seed-dropping mechanism in each side is identical, so that hereinafter only one will be described.

J indicates a partition or bottom in the hopper having a concentric slot in its bottom forming almost a complete circle. At one end of the slot is a block $J^2$, and pivoted within the block is a pawl or cut-off $J^3$, having its free end rounded at $J^4$, and yieldingly pressed downwardly below the level of the partition by a spring $J^5$.

K indicates a block fixed in the hopper below the said partition and having a horizontal shaft $K^2$ fixed therein and a vertical shaft $K^3$ also secured thereto. $K^4$ indicates a disk rotatably mounted upon the shaft $K^3$, directly beneath the partition J, and provided with a series of orifices concentrically arranged directly beneath the slot in the partition. Each orifice is of a size to admit the desired number of grains to be dropped in each hill. It is obvious that the grain in the hopper will normally pass into the orifice and as the disk is rotated the orifices will be successively brought under the spring-actuated pawl $J^3$, and only so much grain as is contained in the orifices may pass thereunder. It is obvious that should a grain project slightly above the top of the disk the pawl will be elevated to permit it to pass and thus prevent the grains from becoming broken or cut.

On the under surface of the disk $K^4$ is a smaller disk L, having peripheral cog-teeth $L^2$ and a ratchet-face $L^3$ on its under side for purposes hereinafter made clear.

Beneath the disk $K^4$ is a second stationary partition M, having a central opening $M^2$ to admit the projection L and an angular opening $M^3$ to permit the grains contained in the orifices of the disk to pass through when in alinement with said opening $M^3$. It is obvious that upon turning the disk far enough to bring a new orifice over the opening $M^3$ a number of grains will be dropped. Motion is imparted to this disk by means of the two spring-actuated pawls N, mounted in the end of the bar F on opposite sides of the shaft $K^3$ to engage the ratchet-surface $L^3$, as clearly illustrated in Fig. 5. By this arrangement the disk is rotated a distance corresponding to the length of one of the ratchet-teeth each time the bar is moved in either direction.

P indicates a wheel rotatably mounted on the shaft $K^2$ and having in its periphery a series of radial pockets arranged to pass directly beneath the angular opening $M^3$ and receive the seeds, each pocket admitting the seeds of one of the orifices in the rotatable disk. On the inner face of the wheel P is a toothed surface $P^2$ in engagement with the cog-teeth $L^2$ on the extension L. This wheel P rotates in a vertical plane, and it is obvious that the seeds held in the pockets thereof will be visible to the operator of the machine for a considerable time before passing to the bottom of the wheel and dropping out. A glass plate $P^3$ is placed adjacent to the wheel to prevent the seeds from falling out at the side, and guides $P^4$ prevent the seeds from falling out until at or near the bottom of the casing.

R indicates a bar pivoted near its central portion in the upright of the runner and having its upper end connected with the sliding bar F, extended from thence downwardly and laterally at $R^2$, beneath the wheel P, and to a point near the bottom of the hollow upright. At its lower end the bar has extensions $R^3$ designed to engage the sides of the interior of the upright. At each movement of the bar F a number of grains are dropped into the hollow upright. The said bar is so arranged that the grains must drop in the side thereof that has its engagement with the inner surface of the upright, so that the grains are held thereby close to the ground-surface, and when the movement is made to drop the grains the machine cannot advance perceptibly during the time that the seeds are dropping into the ground. Upon a movement of the said bar the seeds at one end are dropped into the ground and the seeds in the wheel P dropped into the upright on the opposite side of the bar and caught by the lower end of the bar. An inclined partition or deflector S is located in the lower end of the upright to direct the seeds to a particular point, so that accuracy in planting check-rows may be attained.

The planter is made to drop the seeds at a particular spot, so that the operator may place the rows in alinement, as follows: T, Fig. 1, indicates blocks attached to the sprocket-chain $D^3$ at such distances apart that the chain will pass over the space from one block to the next each time the dropping mechanism is operated. $T^2$ indicates a rod slidingly mounted in the machine-frame to move parallel with the chain, and its ends are bent inwardly.

In use a line is drawn across a field transversely of the rows, the wheels of the planter are placed on the line and the rod moved so that one of its inwardly-turned ends is opposite one of the blocks on the chain. Each time a new row is started the planter is placed on the same line and its wheels turned until one of the blocks of the chain is opposite the same end of the rod, so that as the machine is advanced the first hill will be placed the same distance from the line each time.

I have provided means for automatically marking the ground beside each hill, so that should the hills fail to fall in alinement through the unevenness of the ground-surface or by reason of an obstruction, the defect may be easily noticed by the operator and the wheels of the planter turned so that alinement is secured. To accomplish this, I have provided a lever U, fulcrumed to a suitable support and having a roller on one end inserted in an elliptical eccentric slot $U^3$ formed in one side of the disk $D^4$. On the opposite end of this lever is pivoted an arm V, which in turn is connected with a bar $V^2$ pivoted to the front of the machine-frame and having a small plowshare $V^3$ on its rear end. It is obvious that when the roller is at the bottom of the ellipse the plow will be released and will fall to the ground and mark same and be immediately elevated.

Having thus described my invention, what I claim as new therein, and desire to secure by Letters Patent of the United States therefor, is—

1. The combination in a corn-planter of a shaft driven from the traction-wheels, a disk fixed thereto and having two parallel peripheral grooves, a T-switch pivoted between the grooves with its long arm designed to be alternately forced against the outer edges of both grooves to form a guide from one groove to the other and its short arms each designed to reach to a point near the outer edge of one of the grooves, a slide mounted for movement on the machine, and an arm on said slide to extend into said grooves and engage and operate said switch and means for dropping corn by an actuation of said slide.

2. The combination in a corn-planter, of a wheel rotatably mounted, means connected with said wheel for automatically dropping corn each time the wheel describes a complete revolution, a sprocket-chain for gearing the said wheel to the driving-wheels, a number of blocks fixed to said chain at intervals corresponding to the travel of the chain during one revolution of the wheel, and a rod having inwardly-turned ends slidingly mounted in the machine-frame adjacent to the said sprocket-chain, for the purposes stated.

RILEY R. SPEAR.

Witnesses:
J. RALPH ORWIG,
THOMAS G. ORWIG.